US010676806B2

(12) United States Patent
Abbott, Jr. et al.

(10) Patent No.: US 10,676,806 B2
(45) Date of Patent: Jun. 9, 2020

(54) WEAR RESISTANT COATING

(71) Applicant: HEWLETT-PACKARD DEVELOPMENT COMPANY, L.P., Houston, TX (US)

(72) Inventors: James Elmer Abbott, Jr., Albany, OR (US); Greg Scott Long, Corvallis, OR (US); Roberto A. Pugliese, Tangent, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 343 days.

(21) Appl. No.: 15/329,202

(22) PCT Filed: Jul. 30, 2014

(86) PCT No.: PCT/US2014/048917
§ 371 (c)(1),
(2) Date: Jan. 25, 2017

(87) PCT Pub. No.: WO2016/018312
PCT Pub. Date: Feb. 4, 2016

(65) Prior Publication Data
US 2017/0218492 A1 Aug. 3, 2017

(51) Int. Cl.
*C22C 45/10* (2006.01)
*C23C 26/00* (2006.01)
(Continued)

(52) U.S. Cl.
CPC ........... *C22C 45/10* (2013.01); *B41J 2/14032* (2013.01); *C09D 5/38* (2013.01); *C22C 45/00* (2013.01); *C23C 26/00* (2013.01); *C23C 30/00* (2013.01)

(58) Field of Classification Search
None
See application file for complete search history.

(56) References Cited

U.S. PATENT DOCUMENTS 4,810,314 A      3/1989   Henderson et al.
4,968,363 A  *  11/1990   Hashimoto ............ C22C 45/04
                                                         148/403
(Continued)

FOREIGN PATENT DOCUMENTS

CN          86104496        12/1986
CN           1778979         5/2006
(Continued)

OTHER PUBLICATIONS

Translation of JP 63-125663 (published May 1988) from J-Plat Pat.*
(Continued)

*Primary Examiner* — George Wyszomierski
(74) *Attorney, Agent, or Firm* — Crawford Maunu PLLC

(57) ABSTRACT

A wear resistant coating may comprise an amorphous metal comprising at least one refractory metal, at least two elements selected from periods 4, 5, 6, 9, and 10, and a metalloid. An amorphous metal may comprise at least one refractory metal, at least two elements selected from periods 4, 5, 6, 9, and 10, and a metalloid. A coating may comprise at least one refractory metal, at least two elements selected from periods 4, 5, 6, 9, and 10, and silicon. In some examples, the amorphous metal is TaWSi. In one example, the refractory metals may comprise Niobium, Molybdenum, Tantalum, Tungsten, Rhenium, or combinations thereof.

16 Claims, 1 Drawing Sheet

(51) Int. Cl.
  *C22C 45/00* (2006.01)
  *C23C 30/00* (2006.01)
  *B41J 2/14* (2006.01)
  *C09D 5/38* (2006.01)

(56) References Cited

U.S. PATENT DOCUMENTS

| | | | |
|---|---|---|---|
| 5,559,065 A | 9/1996 | Lauth et al. | |
| 6,270,831 B2 | 8/2001 | Kumar et al. | |
| 6,325,868 B1 | 12/2001 | Kim et al. | |
| 6,838,375 B2 | 1/2005 | Hu | |
| 9,469,107 B2 * | 10/2016 | Abbott, Jr. | B41J 2/14129 |
| 2003/0087096 A1 | 5/2003 | Sato et al. | |
| 2006/0005900 A1 | 1/2006 | Dorfman | |
| 2013/0099360 A1 | 4/2013 | Son | |
| 2014/0010968 A1 | 1/2014 | Prest et al. | |
| 2014/0065445 A1 | 3/2014 | Katano et al. | |

FOREIGN PATENT DOCUMENTS

| | | |
|---|---|---|
| CN | 102094157 A * | 6/2011 |
| CN | 103252495 | 8/2013 |
| CN | 105163941 | 12/2015 |
| CN | 105164300 | 12/2015 |
| CN | 105324512 | 2/2016 |
| DE | 102011001783 A1 * | 10/2012 |
| EP | 0576366 | 5/1993 |
| JP | 63-125663 A * | 5/1988 |
| JP | S63125663 | 5/1988 |
| KR | 20130110689 | 10/2013 |
| TW | I296640 | 12/2004 |
| TW | 201418001 A | 5/2014 |
| WO | WO-2015005932 A1 | 1/2015 |
| WO | WO-2015005933 A1 | 1/2015 |
| WO | WO-2015005934 A1 | 1/2015 |

OTHER PUBLICATIONS

Translation of CN 102094157 (published Jun. 2011) from Espacenet.*
Grubbs, et al. Development and Characterization of High Temperature Stable Ta—W—Si—C Amorphous Metal Gates. Dec. 1, 2010.

* cited by examiner

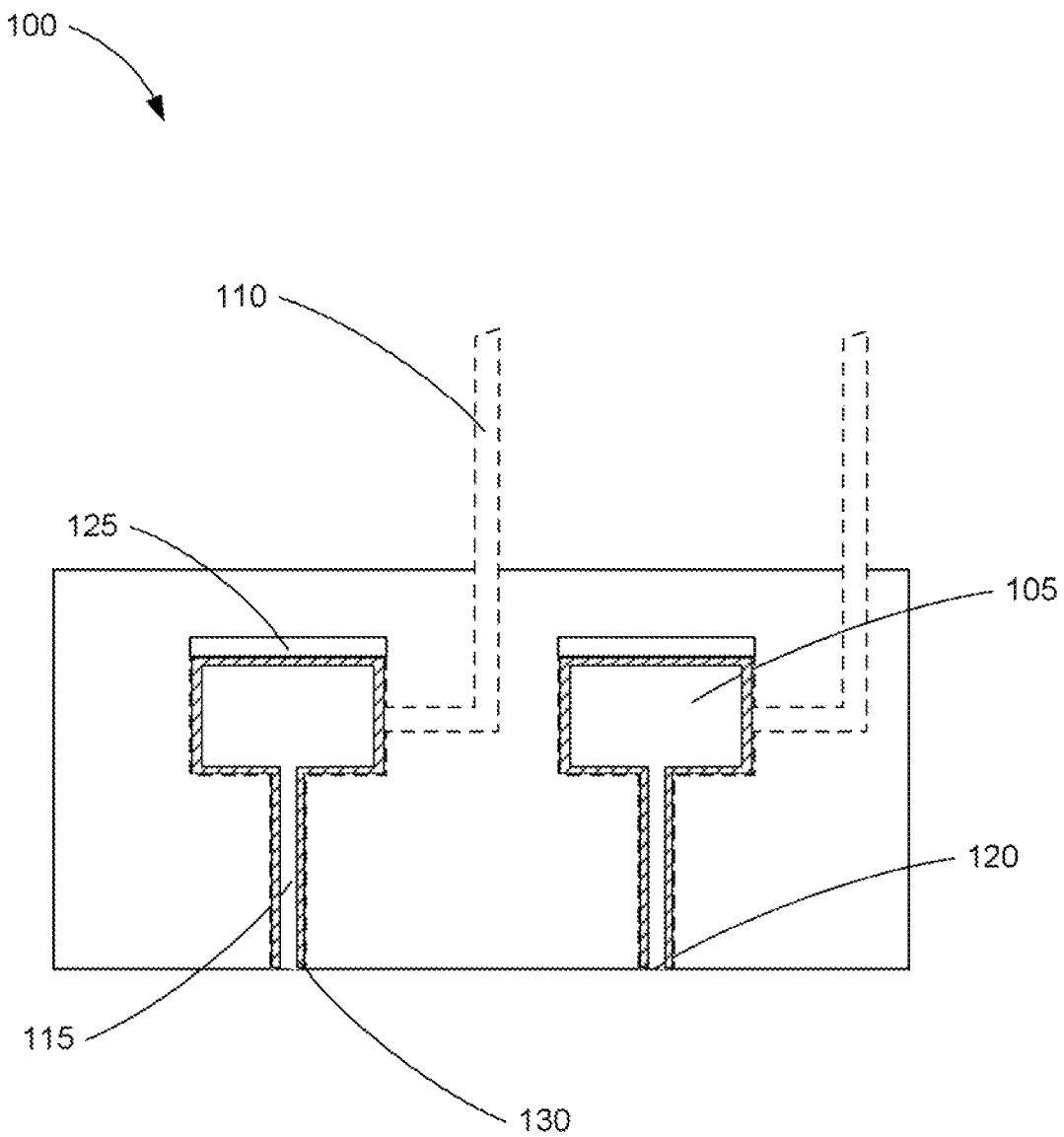

WEAR RESISTANT COATING

BACKGROUND

Amorphous metals comprise robust chemical, mechanical, and thermal properties that may be used in a number of applications. Unlike most metals that are generally crystalline in structure, amorphous metals are non-crystalline such that they retain a high electrical conductivity while still being chemically, mechanically, and thermally robust.

BRIEF DESCRIPTION OF THE DRAWINGS

The accompanying drawings illustrate various examples of the principles described herein, and are a part of the specification. The illustrated examples are given merely for illustration, and do not limit the scope of the claims.

FIG. 1 is a block diagram of a printhead comprising an amorphous metal according to one example of the principles described herein.

Throughout the drawings, identical reference numbers designate similar, but not necessarily identical, elements.

DETAILED DESCRIPTION

Because of the high durability, for example, amorphous metals may be used in a number of environments. In one example, an amorphous metal may be used in environments that experience cavitation forces. One such example is in a thermal inkjet printer. A thermal inkjet printer comprises a number of chambers into which an amount of fluid such as ink is maintained. The chambers are connected to a nozzle bore and a nozzle orifice. A thermal resistor is placed in the chamber. When a current is applied to the resistor, the resistor heats up and in turn heats up the fluid in the chamber. When the fluid in the chamber is heated, bubbles form pushing an amount of the fluid through the nozzle bores and out of the nozzle orifices. However, the bubbles are left to cavitate. Cavitation of the bubbles may cause damage to the surface of the walls of the chamber. The chamber is generally made of a metal comprising a crystalline form. The crystalline structure leads to grain boundaries and a relatively rough surface. Additionally, as heat is applied to these metals, the properties of the metals may change, causing degradation and destruction of the chamber and printhead over time.

Different metal alloys with a resistance to cavitation are frequently not able to be machined. In order to better form metals for machines that are subjected to mechanical abrasions, a more easily machined alloy may be used. However, this leads to use of metals that are more susceptible to cavitation or abrasion damage. Different coatings have been proposed including elastomers to dissipate energy reaching the surface of the metal used. However, these coatings do not increase the cavitation resistance of the underlying layer. Additionally these materials are only compatible with a limited number of environments. Different hard facing materials like TiN can be used to prevent damage, but these types of materials can be brittle leading to cracking under certain conditions on certain substrates.

The present specification therefore describes a wear resistant coating comprising an amorphous metal comprising at least one refractory metal, at least two elements selected from periods 4, 5, 6, 9, and 10, and a metalloid. In one example the amorphous metal is TaWSi.

The present specification further describes an amorphous metal comprising at least one refractory metal, at least two elements selected from periods 4, 5, 6, 9, and 10, and a metalloid. In one example, the amorphous metal further comprises three additional elements selected from groups 4, 5, 6, 9, 10 of the Periodic Table or combinations thereof. In one example, the amorphous metal comprises Tantalum (Ta), Tungsten (W), Silicon (Si).

The present specification further describes a coating comprising at least one refractory metal, at least two elements selected from periods 4, 5, 6, 9, and 10, and silicon. In one example, the refractory metals comprise Niobium, Molybdenum, Tantalum, Tungsten, Rhenium, or combinations thereof.

As used in the present specification and in the appended claims, a "refractory metal" is meant to be understood as Niobium, Molybdenum, Tantalum, Tungsten, Titanium, Rhenium, Vanadium, Chromium, Zirconium, Hafnium, Ruthenium, Rhodium, Osmium, and iridium.

Additionally, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the FIGURES, FIG. 1 shows a block diagram of a printhead (100) comprising an amorphous metal according to one example of the principles described herein. The printhead (100) comprises an ejection chamber (105) into which an amount of fluid is supplied via a fluid supply line (110). The printhead (100) further comprises a nozzle bore (115) that connects the ejection chamber (105) to the nozzle (120). Still further, the ejection chambers (105) comprise a thermal resistor (125). The thermal inkjet is in communication with an electrical source. As a current is passed through the resistor (125) the resistor heats up and creates bubbles in the fluid maintained in the chamber (105). The bubbles create pressure in the chamber (105) that force the fluid out of the chamber (105) and into the nozzle bore (115).

According to one aspect of the present specification, the chamber (105) is covered with a wear resistant coating (130). The wear resistant coating (30) comprises the amorphous metal. In one example, the amorphous metal comprises a refractory metal and a metalloid. In another example, the amorphous metal comprises two or three metallic elements from periods 4, 5, 6, 9, and 10 of the periodic table with the addition of Si as a metalloid component. In another example, a trace amount of oxygen is incorporated into the wear resistant coating (130). This may be done in order to stabilize the material while maintaining the properties of an amorphous metal. In other examples, the amorphous metal may comprise Ta, W, Ni, Pt, Mo, Si, O, or combinations thereof. In other examples, the amorphous metal may comprise Ta, W, Ni, Pt, Mo, Si, O, V, Nb, Ti, Zr, Hf, Cr, Co, Pd, Rh, Ir, or combinations thereof. In one example, the amorphous metal is TaWSi. In an example, the thickness of the coating (130) may be 0.5 microns thick.

Although FIG. 1 describes the use of the amorphous metal in the ejection chamber (105) of an inkjet printhead, the amorphous metal described and claimed herein may be used for any surface that is subjected to a mechanical abrasion such as cavitation abrasion. In some examples, the mechanical abrasions are repeated a number of times. Due to the properties of the amorphous metal described herein, a wear resistant coating (130) comprising the amorphous metal will resist the effects of this constant mechanical abrasion. Consequently, the wear resistant coating (130) comprising the amorphous metal may be used on boiling surfaces, in chemical reactors, jet turbines, boat propellers, among others.

In one example, the wear resistant coating (130) may be applied to a surface without any additional processes. In this example, ambient deposition conditions may be present when depositing the coating (130) onto a surface. Investigation of the wear resistant coating (130) described here has demonstrated that the coating (130) is extremely abrasion resistant. Experimentation comparing the performance of a TaWSi amorphous metal to Ta demonstrated significant damage to the Ta and essentially no damage to the amorphous metal.

The specification and FIGURES describe a wear resistant coating (130). The coating (130) has the advantage of being free of grain boundaries. Additionally, the wear resistant coating (130) has an atomically smooth interface. The relatively highly stable amorphous structure improves the mechanical robustness of the thin coatings (130) leading to excellent fatigue resistant properties. These materials are highly desirable for integration into harsh environments comprising mechanical abrasion requiring consistent component performance over extended period of time. The coating (130) makes it possible to deposit it on a wide variety of substrates for a variety of abrasion resistant applications. These substrates can include metals, glasses, and plastic materials.

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
    a wear resistant coating that coats a surface of the apparatus, the wear resistant coating including an amorphous metal comprising:
    tantalum;
    at least five elements selected from groups 4, 5, 6, 9, and 10 of the Periodic Table; and
    at least one metalloid.

2. The apparatus of claim 1, in which the at least one metalloid is Silicon (Si).

3. The apparatus of claim 1, the apparatus further including a printhead, in which the wear resistant coating coats a chamber wall of a firing chamber in the printhead.

4. The apparatus of claim 1, in which the amorphous metal comprises Tantalum (Ta), Tungsten (W), Silicon (Si), and at least three additional elements selected from groups 4, 5, 6, 9, and 10 of the Periodic Table.

5. The wear resistant coating of claim 1, wherein the amorphous metal includes Molybdenum (Mo).

6. The wear resistant coating of claim 1, wherein the amorphous metal includes Rhenium (Re).

7. An amorphous metal comprising tantalum, at least five elements selected from groups 4, 5, 6, 9, and 10 of the Periodic Table, and a metalloid.

8. The amorphous metal of claim 7, in which the metalloid is Silicon (Si).

9. The amorphous metal of claim 7, in which the number of elements selected from the groups 4, 5, 6, 9, and 10 of the Periodic Table is six.

10. The amorphous metal of claim 7, comprising Tantalum (Ta), Tungsten (W), Silicon (Si), and at least three additional elements selected from the groups 4, 5, 6, 9, and 10 of the Periodic Table.

11. The amorphous metal of claim 7, wherein the amorphous metal is a coating that coats a chamber wall of a firing chamber in a printer head, the metal comprising Tantalum (Ta), Tungsten (W), Silicon (Si), and at least three additional elements selected from the groups 4, 5, 6, 9, and 10 of the Periodic Table.

12. A coating comprising:
    tantalum;
    at least five elements selected from groups 4, 5, 6, 9, and 10 of the Periodic Table; and
    silicon (Si).

13. The coating of claim 12, wherein the coating comprises Tantalum (Ta), Tungsten (W), the Si, and at least three additional elements selected from the groups 4, 5, 6, 9, and 10 of the Periodic Table or combinations thereof.

14. The coating of claim 12, wherein the coating comprises Niobium (Nb).

15. The coating of claim 12, wherein the coating coats a chamber wall of a firing chamber in a printhead.

16. The coating of claim 12, wherein the coating is free of grain boundaries.

* * * * *